United States Patent
Yokawa

(10) Patent No.: US 7,923,634 B2
(45) Date of Patent: Apr. 12, 2011

(54) METHOD FOR PRODUCING A PANEL STORAGE FRAME AND PANEL STORAGE FRAME

(75) Inventor: Akira Yokawa, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 650 days.

(21) Appl. No.: 12/011,307

(22) Filed: Jan. 26, 2008

(65) Prior Publication Data

US 2008/0180894 A1 Jul. 31, 2008

(30) Foreign Application Priority Data

Jan. 26, 2007 (JP) ................. 2007-016297

(51) Int. Cl.
*H02G 3/08* (2006.01)

(52) U.S. Cl. .............. 174/50; 174/69; 174/58; 361/600; 248/906; 439/535

(58) Field of Classification Search ............ 174/50, 174/58, 69; 220/4.02; 439/535; 248/906; 361/600; 72/324, 341, 347

See application file for complete search history.

(56) References Cited

U.S. PATENT DOCUMENTS

| 4,634,015 | A | * | 1/1987 | Taylor | 220/3.7 |
| 5,264,765 | A | | 11/1993 | Pecorino et al. | |
| 6,889,881 | B2 | * | 5/2005 | Wilkens | 224/509 |
| 6,940,016 | B1 | * | 9/2005 | Cornett et al. | 174/58 |
| 7,387,350 | B2 | * | 6/2008 | Killinger et al. | 312/290 |
| 2005/0212982 | A1 | | 9/2005 | Soga | |
| 2006/0232723 | A1 | | 10/2006 | Maruta | |

FOREIGN PATENT DOCUMENTS

| EP | 0966159 | A | 12/1999 |
| GB | 2032767 | A | 5/1980 |
| GB | 2266741 | * | 11/1993 |
| JP | 3112212 | U | 6/2005 |
| JP | 2006-126436 | | 5/2006 |

OTHER PUBLICATIONS

The extended European search report, pursuant to Rule 62 EPC dated Aug. 28, 2008, searched on Aug. 20, 2008.

* cited by examiner

*Primary Examiner* — Dhiru R Patel

(74) *Attorney, Agent, or Firm* — Yokoi & Co., U.S.A., Inc.; Toshiyuki Yokoi

(57) ABSTRACT

The manufacturing method of the panel installation portion 12*a* allows the portions of the upper block and the lower block for forming the panel installation portion to be exchanged as the nesting blocks upon press working so as to change the protruding amount of the panel installation portion from the outer peripheral surface.

10 Claims, 13 Drawing Sheets

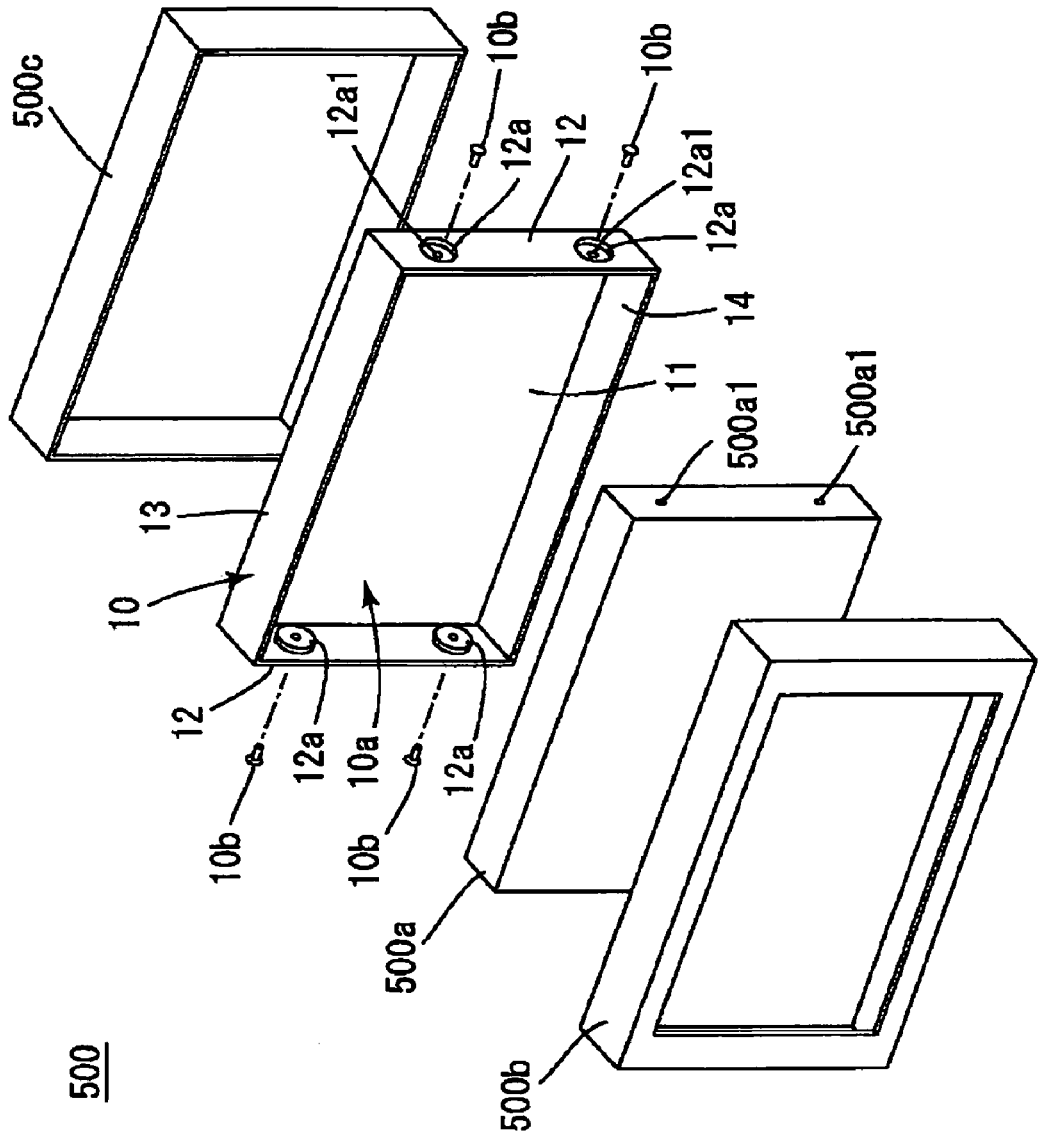

PRIOR ART

METHOD FOR PRODUCING A PANEL STORAGE FRAME AND PANEL STORAGE FRAME

CROSS-REFERENCES TO RELATED APPLICATIONS

The present application is related to the Japanese Patent Application No. 2007-016297, filed Jan. 26, 2007, the entire disclosure of which is expressly incorporated by reference herein.

BACKGROUND OF THE INVENTION (1) Field of the Invention

The present invention relates to a method for producing a panel storage frame and a panel storage frame produced through the production method.

(2) Description of the Related Art

Recently, a flat-screen TV receiver has been increasingly distributed. The thickness of the flat-screen TV receiver has been reduced by the use of the thin panel, hardly requiring the depth which has been needed for the generally employed cathode-ray tube. The liquid crystal panel, the plasma panel and the like have been employed as the thin panel.

FIG. 13 is a view showing the inner structure of the generally employed flat-screen TV receiver. Referring to the drawing, a flat-screen TV receiver 1 includes a panel 2 for displaying the video image, a frame 3 which protects the panel 2, a control substrate for driving the panel 2 (not shown), and a cabinet 4 which stores the panel 2 protected by the frame 3. The frame 3 formed through the sheet metal working has a recess portion to surround the outer periphery of the panel 2. The cabinet 4 has the space for storing the panel 2 having the outer periphery surrounded with the frame 3.

Registered Utility Model Publication No. 3112212 discloses the flat-screen TV receiver having the frame 3 surrounding the outer periphery of the panel 2 and located at a predetermined position of the cabinet 4 so as to be fixed. The frame 3 serves to protect the panel 2 from the impact exerted from outside together with the cabinet 4. Each size of the frame 3 and the cabinet 4 is determined in accordance with the size of the panel 2, and accordingly, needed to be designed to match the size of the panel 2.

The panel 2 of the aforementioned flat-screen TV receiver 1 demands the sophisticated production technology, resulting in the increased process steps. Upon production of the flat-screen TV receiver 1, there may be the case that the panel 2 manufactured outside is purchased to be assembled with the self-manufactured parts. In the aforementioned case, the frame 3 and the cabinet 4 are required to be designed to match the size of the panel 2. Upon replacement of the panel 2, the re-design of those components is required, thus increasing the production costs.

Japanese Unexamined Patent Application Publication No. 2006-126436 discloses the production method of the cabinet to match the size of the panel. More specifically, the production method of the base cabinet of the video unit of rear-projection type with which the chassis such as the optical system is assembled between the upper cabinet formed of the resin material and the base cabinet is disclosed. In the disclosed production method, a part of the mold for forming both ends of the base cabinet in the width direction is formed as a nesting structure corresponding to the width of the upper cabinet designed to match the size of the chassis to be assembled. The width of the base cabinet may be adjusted in accordance with the configuration of the nesting structure, thus making it possible to produce the base cabinet with different configuration in a single mold.

The aforementioned Utility Model Publication No. 3112212 has a disadvantage requiring the frame to be redesigned to match the size of the panel, resulting in the cost for preparing to produce the mold used to manufacture the frame.

Japanese Unexamined Patent Application Publication No. 2000-126436 is intended to change the size of the upper cabinet by changing the surface size of the opposite base cabinet formed of the resin extending in the width direction. The manufacturing method of the resin frame is different from that of the sheet metal frame. It is therefore difficult to apply the art disclosed in Japanese Unexamined Patent Application Publication No. 2006-126436 to the present invention. The base cabinet is formed by applying the melted resin material to the cavity formed of the upper and the lower mold. Briefly speaking, the size of the cabinet may be changed by changing the size of the cavity. Meanwhile, the production method of the sheet metal frame is totally different because the frame is formed through the bending process, extrusion process and the like.

The art disclosed in Japanese Unexamined Patent Application Publication No. 2006-126436 is intended to change the width of the base cabinet in accordance with the width of the upper cabinet. As formation of the frame which stores the panel with different size is required to change the position of the fixture and the thickness in addition to the change in the width, only the two dimensional change in the width of the base cabinet is insufficient to satisfy the requirement as described above.

BRIEF SUMMARY OF THE INVENTION

The present invention discloses a frame production method capable of coping with the change in the panel size to be used without changing the outer configuration of the frame while suppressing the required process steps as least as possible, and reducing the production costs to be lower than the generally employed production method.

On aspect to the present invention provides in a panel storage frame production method for producing a panel storage frame formed of a sheet metal to cover a thin panel through a press working according to the present invention, the panel storage frame has a panel installation portion that protrudes inward from a surface opposite a side surface of the panel to fix the panel to the panel storage frame, and a portion of a mold for forming the panel installation portion for press working of the panel storage frame is formed as a nesting block that is exchangeable to change a protruding amount of the panel installation portion from a surface opposite the side surface of the panel, and to make a size of the panel allowed to be stored in the panel storage frame adjustable.

In the aforementioned structure, the panel storage frame fixes the panel with the panel installation portion so as to be stored inside. The panel installation portion is formed to protrude inward from the surface opposite the side surface of the panel of the panel storage frame. The portions of the upper and the lower blocks for manufacturing the panel installation portion are formed as the nesting blocks. As the nesting blocks may be exchanged to change the protruding amount of the panel installation portion, the position where the panel is fixed to the panel installation portion is changed upon the press working. This makes it possible to change the size of the panel to be stored in the panel storage frame.

The panels with various sizes may be fixed to the panel storage frame only by changing the protruding amount of the panel installation portion while keeping the outer peripheral dimension of the panel storage frame unchanged. The method for producing the panel installation portion allows the panel with various sizes to be stored by exchanging the nesting blocks of the upper and the lower blocks. The upper and lower blocks may be used to any type of the panel by exchanging the nesting blocks, thus suppressing the cost for producing the mold. Even if the size of the panel to be used is changed, the panel storage frame may be stored in the reduced number of changing process steps at the lower production costs without changing the outer configuration of the frame.

There are various structures of the panel installation portion to be formed through the press working. Preferably, the panel installation portion is formed through a deep draw processing to protrude inward from the surface opposite the side surface of the panel, and the nesting block is exchanged to vary the protruding amount of the panel installation portion formed through the deep draw processing.

In the aforementioned structure, the panel installation portion is formed through the deep draw processing to protrude from the side surface of the panel storage frame. The portion of the mold for forming the panel installation portion formed as the nesting block is exchanged to change the protruding amount of the deep draw processing so as to cope with various sizes of the panel. The use of the deep draw processing makes it possible to easily adjust the protruding amount of the panel installation portion.

In another aspect of the present invention, the panel installation portion has a portion to be cut and erected from a surface opposite the side surface of the panel, and a leading end of the cut and erected portion is folded to form a surface for fixing the panel. A length of the portion to be cut and erected from the surface opposite the side surface of the panel is changed by exchanging the nesting block.

In the aforementioned structure, the panel installation portion is cut and erected through bending in the press working. As the nesting blocks of the mold are exchanged, the length from the surface opposite the side surface of the panel to the tip of the erected portion may be changed. On the surface where the deep draw processing cannot be performed, the panel installation portion may be formed by cutting and erecting. The adjustment of the degree for cutting and erecting makes it possible to easily adjust the protruding amount. The panel installation portion may be easily formed on the area of the side surface that fails to cope with the deep draw processing.

When the panel installation portion is formed through cutting and erecting, the following technique makes it possible to firmly fix the panel to the panel storage frame. When the panel installation portion is formed by cutting the side surface of the panel storage frame to be erected, the cut portion is erected to be bent in the direction with respect to the side surface not in accord with the load direction of the panel fixed to the panel installation portion.

In the aforementioned structure, the panel installation portion is formed on the side surface of the panel storage frame such that the bending direction from the side surface is not in accord with the load direction of the panel to be installed. More specifically, supposing that the surface on which the panel image is displayed is defined as the front surface, the panel installation portion is folded in the direction substantially perpendicular to the front surface of the panel such that the load of the panel is in accord with the folded direction. In the aforementioned case, as the bending direction is in accord with the load exertion direction, there may be the case where the bending angle is widened, thus failing to allow the panel to be located at the appropriate position with respect to the panel storage frame. Meanwhile, if the panel installation portion is folded in the direction to be in parallel with the load of the panel, the folding direction is not in accord with the panel load. This makes it possible to form the panel installation portion with sufficient strength to bear the load of the panel.

As another specific structure of the panel installation portion, the surface opposite the side surface of the panel is bent to substantially perpendicularly extend from a surface opposite a back surface of the panel. The panel installation portion has two cut lines at a predetermined interval across a folding line between a surface opposite a back surface of the panel and a surface opposite the side surface of the panel, and has an inner portion defined by the two cut lines at the predetermined interval is folded at a position apart from a predetermined distance from the surface opposite the back surface of the panel upon folding of the surface opposite the side surface of the panel substantially perpendicularly to the surface opposite the back surface of the panel. A protruding amount of the panel installation portion from the side surface is changed by exchanging the nesting block to vary the length of the position to be folded from the side surface.

In the aforementioned structure, the inner portion defined by two cut lines apart at a predetermined distance across two adjacent surfaces is folded at the position with a predetermined length from the back surface to form the panel installation portion. At this time, the nesting blocks are exchanged to change the length folded from the back surface to allow the change in the protruding amount from the surface opposite the side surface of the panel. It is therefore possible to change the protruding amount by changing the folding position with the simple structure.

The present invention is further advantageous to the panel storage frame formed through the aforementioned production method. In the present invention, the panel storage frame has a panel installation portion that protrudes inward from a surface opposite a side surface of the panel to fix the panel to the panel storage frame. A portion of a mold for forming the panel installation portion for press working of the panel storage frame is formed as a nesting block that is exchangeable to change a protruding amount of the panel installation portion from a surface opposite the side surface of the panel, and to make a size of the panel allowed to be stored in the panel storage frame adjustable.

The present invention is applicable to the panel storage frame to be produced with the method according to the aforementioned aspects. The present invention provides the panel storage frame to be produced in the aforementioned method.

In a panel storage frame formed of a sheet metal to cover a thin panel through a press working according to another aspect of the present invention, the panel storage frame includes a panel installation portion on a surface opposite a side surface of the panel for fixing the panel to the panel installation frame. The panel storage frame is formed through a cutting step for cutting an outer surface of the panel storage frame from the sheet metal, a step for forming the panel installation portion through a deep draw processing using a mold, and a step for forming an outer peripheral surface opposite a back surface and a side surface of the panel through a bending processing. When the panel installation portion is formed to protrude inward from the surface opposite the side surface of the panel using the mold, the step for forming the panel installation portion allows a portion of the mold for forming the panel installation portion to be exchanged as a nesting block so as to make a protruding amount of the panel installation portion from the surface opposite the side surface of the panel changeable.

These and other features, aspects, and advantages of invention will be apparent to those skilled in the art from the following detailed description of preferred non-limiting exemplary embodiments, taken tog ether with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

FIG. 1 is a view showing an inner structure of a TV receiver 500.

DETAILED DESCRIPTION OF THE INVENTION

Figure 2A:
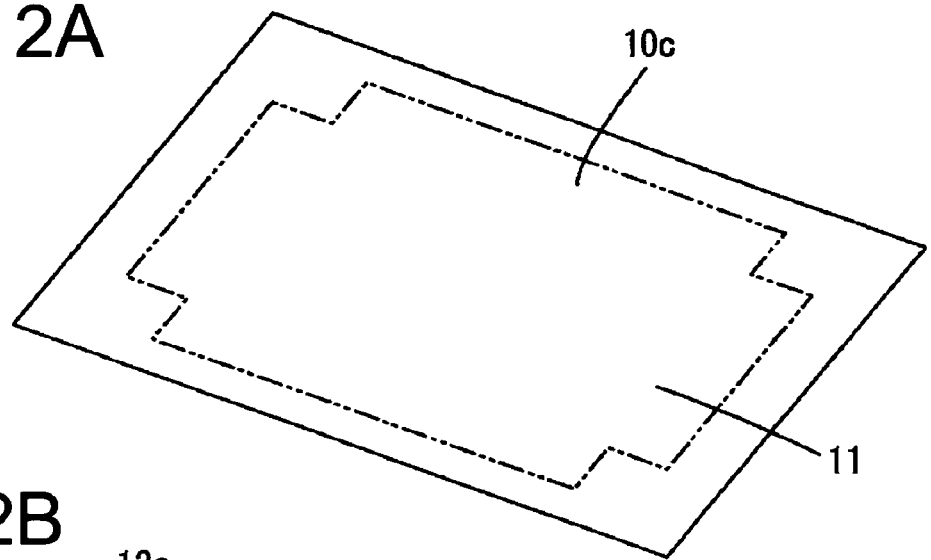
FIGS. 2A to 2C briefly show the steps for producing a panel storage frame 10.

The detailed description set forth below in connection with the appended drawings is intended as a description of presently preferred embodiments of the invention and is not intended to represent the only forms in which the present invention may be constructed and or utilized.

The production method of the panel storage frame according to the embodiments of the invention will be described in sections as follows.

(1) First Embodiment
(1-1) Panel storage frame
(1-2) Production method of panel storage frame
(1-2-1) Cutting step
(1-2-2) Step for forming panel installation portion
(1-2-3) Step for forming outer peripheral surface
(2) Second Embodiment
(3) Third Embodiment
(4) Effect

(1) First Embodiment

(1-1) Panel Storage Frame

A first embodiment as a specific form of the production method of a panel storage frame according to the present invention will be described referring to FIGS. 1 to 4.

FIG. 1 is a view showing an inner structure of a TV receiver 500 which includes a panel 500a for displaying a video image, a panel storage frame 10 disposed to cover the outer periphery of the panel 500a, and a front cabinet 500b and a rear cabinet 500c which store the panel 500a installed in the panel storage frame 10. A substrate (not shown) on which the respective circuits for driving the TV receiver 500 are mounted is fixed to the back surface of the panel 500a installed in the panel storage frame 10.

The panel storage frame 10 for storing the thin panel 500a to surround its outer periphery includes a substantially rectangular back surface 11, side surfaces 12, 12 which erect perpendicular to the back surface 11 from the respective sides thereof, a top surface 13 and a bottom surface 14. The aforementioned surfaces form a recess portion 10a for storing the panel 500a. The side surfaces 12, 12 are provided with panel installation portions 12a for fixing the panel 500a to the panel storage frame 10.

The panel installation portions 12a are in surface contact with the side surfaces of the panel 500a, and tightened with screws 10b together with the panel 500a. Each of the panel installation portions 12a forms a planar surface around a top portion protruding from the side surface 12 to the inside the panel storage frame 10. The planar surface around the top portion has a through hole 12a1 formed therein. Each of the side surfaces of the panel 500a has holes 500a1 provided with internal threads formed therein corresponding to the through holes 12a1.

The panel 500a is stored in the recess portion 10a of the panel storage frame 10 such that the back surface of the panel 500a faces the back surface 11 of the panel storage frame 10. The screws 10b are threaded from outside the panel installation portions 12a into the through holes 12a1 to be tightened together with the internal threads 500a1 of the panel 500a such that the panel 500a is fixed to the panel storage frame 10. The production method of the panel storage frame 10 will be described hereinafter.

(1-2) Production Method of Panel Storage Frame

Figure 2B:
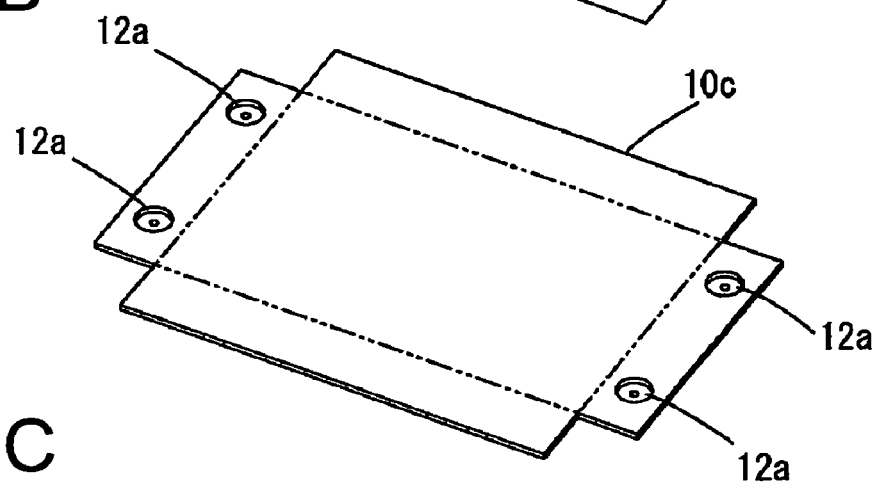
Figure 2C:
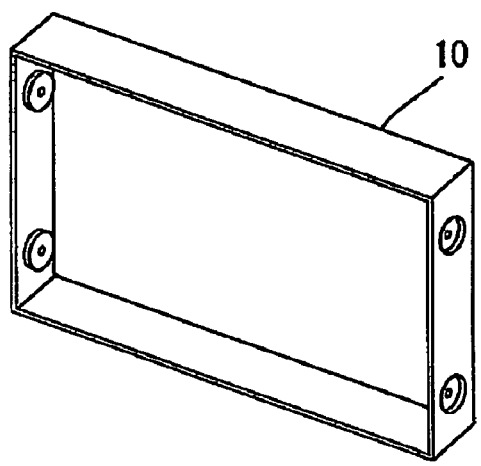

FIGS. 2A to 2C briefly show the steps in the production method of the panel storage frame 10. Referring to the drawing, the panel storage frame 10 is formed through the cutting step shown in FIG. 2A for cutting a material sheet 10c from a thin metal sheet material, the step for forming the panel installation portions 12a shown in FIG. 2B using the material sheet 10c cut through the press working, and the step shown in FIG. 2C for forming the outer peripheral surface including the side surfaces 12, the top surface 13 and the bottom surface 14 of the panel storage frame 10 with the press working mold.

(1-2-1) Cutting Step

In the cutting step shown in FIG. 2A, the material sheet 10c for forming the panel storage frame 10 is cut from the thin metal sheet material. Specifically, the press mold (not shown) including the upper and the lower blocks is used to cut the material sheet 10c for forming the panel storage frame 10 from the metal sheet material. In this case, the material sheet 10c to be cut is substantially a cross-shaped including the surface formed as the back surface 11 of the panel storage frame 10, and the rectangular surfaces each extending from the respective sides of the back surface 11. As a result, the side surfaces 12, 12, the top surface 13, and the bottom surface 14 are formed in the development state of the panel storage frame 10. Each length of the surfaces extending from the respective four sides of the back surface 11 is equal to the thickness of the panel storage frame 10.

(1-2-2) Step for Forming Panel Installation Portion

In the step for forming the panel installation portion shown in FIG. 2B, the panel installation portions 12a for forming the panel storage frame 10 are formed on the cut material sheet 10c. The panel installation portions 12a are formed on the side surfaces 12, 12 of the panel storage frame 10. In the step for forming the panel installation portions, the portions of the material sheet 10c corresponding to the side surfaces 12 are extruded and subjected to the deep draw processing using the press mold such that two panel installation portions 12a are formed in the respective side surfaces 12. The upper and the lower blocks of the press mold to be used include portions formed as nesting blocks fixed to allow the portion for forming the panel installation portion 12a to be exchanged for making the protruding amount from the portion corresponding to the side surface 12 adjustable. The step for forming the panel installation portion will be described in detail.

Figure 3:
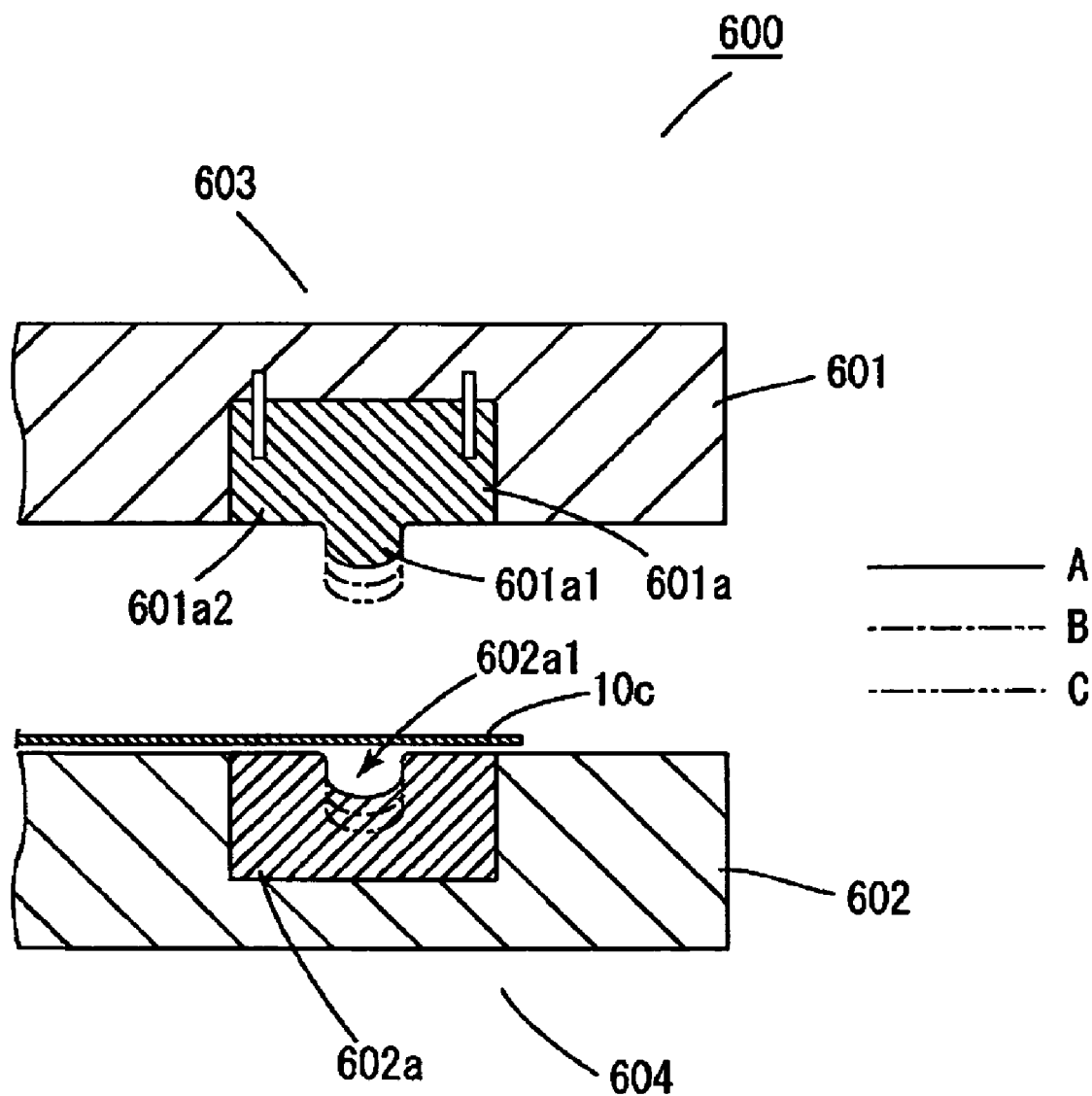
FIG. 3 is a cross-sectional view showing an upper block 601 and a lower block 602 of a press mold 600 used in a process for forming a panel installation portion, and a material sheet 10c.

FIG. 3 is a cross-sectional view of an upper block 601 and a lower block 602 of the press mold 600, and the material sheet 10c used in the step for forming the panel installation portion. Referring to FIG. 3, the press mold 600 for forming the panel installation portions 12a includes the upper block 601 and the lower block 602 directly in contact with the material sheet 10c to be processed, holding portions 603 and 604 for holding the upper and the lower blocks 601 and 602, and an auxiliary portion (not shown) for moving the upper block 601 up and down.

The process for forming the panel installation portions 12a using the press mold 600 will be briefly described. The material sheet 10c cut in the cutting step is set in position with location pins for positioning the material sheet 10c to be disposed on the lower block 602 or the holding portion 604. Then the operator drives the press mold 600 to allow the auxiliary portion to move the upper block 601 held by the holding portion 603 downward. At this time, a nesting block 601a is detachably fit with a portion of the upper block 601 for forming the panel installation portions 12a, and a nesting block 602a is detachably fit with a portion of the lower block 602.

The nesting block 601a includes a punch portion 601a1 used for the deep draw processing, which is detachably fixed to have the protruding direction from a fixed portion 601a2 of the punch portion 601a1 downward from the press surface of the upper block 601. The nesting block 602a is detachably fixed with the lower block 602 such that the opening of a die 602a1 for the deep draw processing is formed at the upper portion of the press surface of the lower block 602. The punch portion 601a1 of the nesting block 601a and the die 602a1 of the nesting block 602a are fixed such that the punch portion 601a1 is fit with the opening of the die 602a1 upon downward movement of the upper block 601. In the press working of the material sheet 10c between the upper and the lower blocks 601 and 602, the leading end of the punch portion 601a1 presses the material sheet 10c fixed on the lower block 602 along the cross section of the opening of the die 602a1. The panel installation portion 12a is formed in the material sheet 10c through the deep draw processing using the upper block 601 and the lower block 602.

In the embodiment, each configuration of the panel installation portions 12a to be formed on the side surfaces 12, 12 of the panel storage frame 10 may be changed by exchanging the nesting blocks 601a and 602a. Specifically, the protruding amount from the side surface 12 to the panel installation portion 12a in the deep draw processing may be changed by exchanging the nesting blocks 601a and 602a.

An exemplary case where three pairs of the exchangeable nesting blocks 601a and 602a are used will be described. The nesting block 601a detachably fixed to the upper block 601 has three types each having different height of the punch portion 601a1 protruding from the fixed portion 601a2. The opening of the die 602a1 of the nesting block 602a detachably fixed to the lower block 602 has three types each having the different depth corresponding to the height of the punch portion 601a1. It is assumed that the nesting block 601a which includes the punch portion 601a1 protruding from the fixed portion 601a2 with the lowest height is defined as a nesting block A (indicated by the solid line). The nesting block 601a which includes the punch portion 601a1 with the intermediate height is defined as a nesting block B (indicated by a dashed line). The nesting block 601a which includes the punch portion 601a1 with the greatest height is defined as a nesting block C (indicated by a chain double-dashed line). The nesting blocks 602a corresponding to the respective nesting blocks 601a will be defined as a nesting block A (indicated by a solid line), a nesting block B (indicated by a dashed line), and a nesting block C (indicated by a chain double-dashed line), respectively.

The protruding amount of the panel installation portion 12a from the side surface 12 formed using the pair of the nesting blocks A becomes the smallest. The protruding amounts using the pairs of the nesting blocks B and C become intermediate and the largest, respectively. Exchanging the nesting blocks 601a and 602a makes it possible to change the protruding amount of the panel installation portion 12a from the side surface 12. Preferably each protruding amount of those four panel installation portions 12a is determined in consideration with the limited height of the draw processing.

1-2-3 Step for Forming Outer Peripheral Surface

Figure 4:
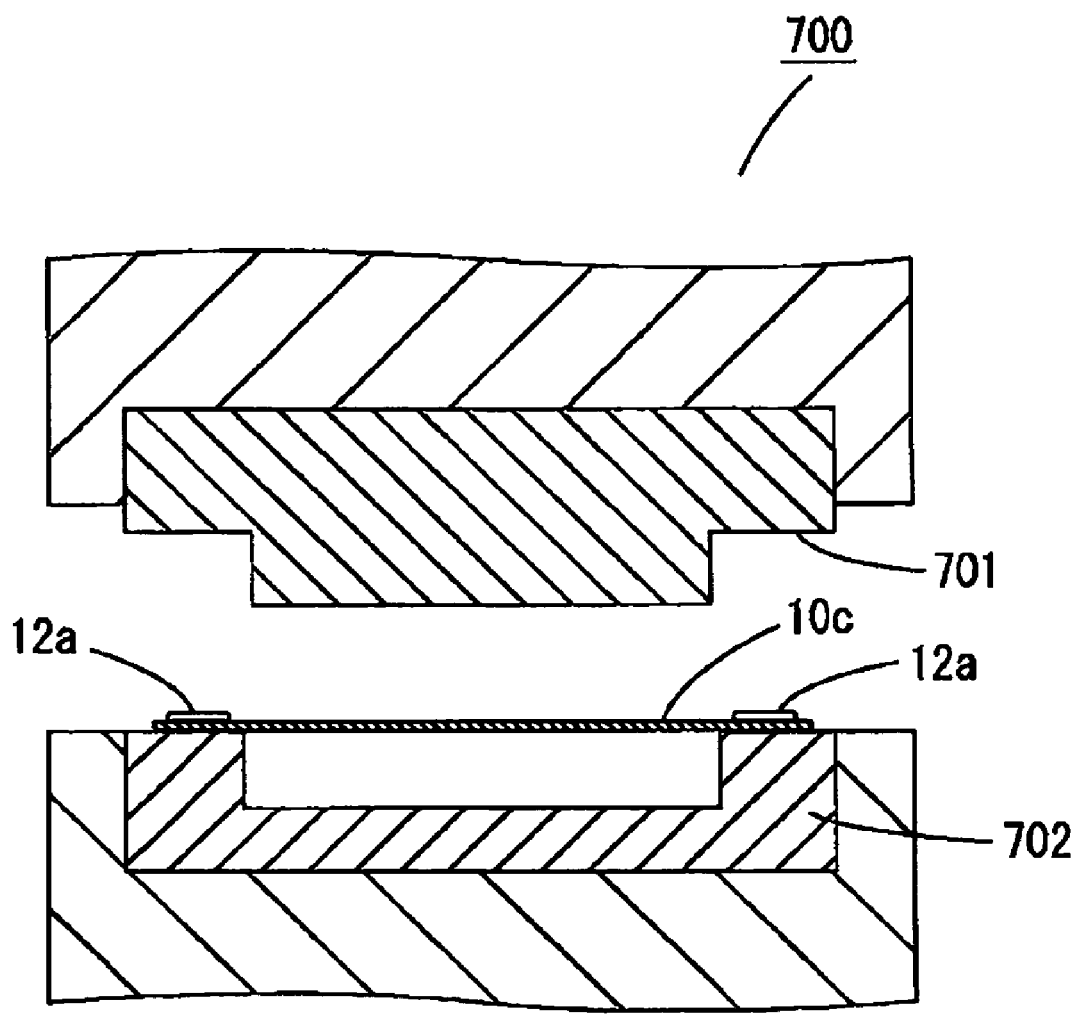
FIG. 4 is a view showing the formation of the outer peripheral surface of the panel storage frame 10.

FIG. 4 is a view showing the formation of the outer peripheral surface of the panel storage frame 10. After the panel installation portions 12a are formed in the material sheet 10c, the outer peripheral surface is formed using a new press mold 700 as shown in FIG. 2C. Specifically, the material sheet 10c is set on a lower block 702 having each protruding direction of the panel installation portions 12a, which has been subjected to the deep draw processing directed upward. The upper block 701 is vertically moved down to press the material sheet to follow the configuration of the inner wall of the lower block 702. In this way, the outer peripheral surface is formed from the material sheet 10c by substantially perpendicularly bending four sides of the back surface 11.

The panel installation portions 12a formed on the side surfaces 12 are folded substantially perpendicularly to the back surface 11 with the upper block 701. When the side surfaces 12 are folded, the panel installation portions 12a are expected to abut on the side surface of the upper block 701. In order to avoid the aforementioned abutment, the size of the cross section of the upper block 701 is set to be equal to the dimension of the inner periphery formed by the leading end of the panel installation portion 12a protruding from the side surface 12, the top surface 13, and the bottom surface 14. As the protruding amount of the panel installation portion 112a from the side surface 12 is considerably small, the side surface 12 hardly influences the bending work of the back surface 11. In the case where the protruding amount of the panel installation portion 12a from the side surface 12 is set to be relatively large, the upper block 701 is required to be configured so as not to interfere with the panel installation portion 12a. Specifically, a notch groove may be formed in the cross section of the upper block 701 so as not to interfere with the panel installation portions 12a.

(2) Second Embodiment

In the first embodiment, the panel installation portion is formed through the deep draw processing to protrude inward from the side surface 12 of the panel storage frame 10. The process for forming the panel installation portion is not limited to the deep draw processing, but may be arbitrarily performed so long as various sizes of the panel 500a is stored without changing the outer dimension of the panel storage frame 10. In the second embodiment, the panel installation portion is formed through the bending process. This makes it possible to form the panel installation portions even if the deep draw processing cannot be performed on the area of the side surface 12. The specific configuration of the second embodiment will be described as below.

Figure 5:
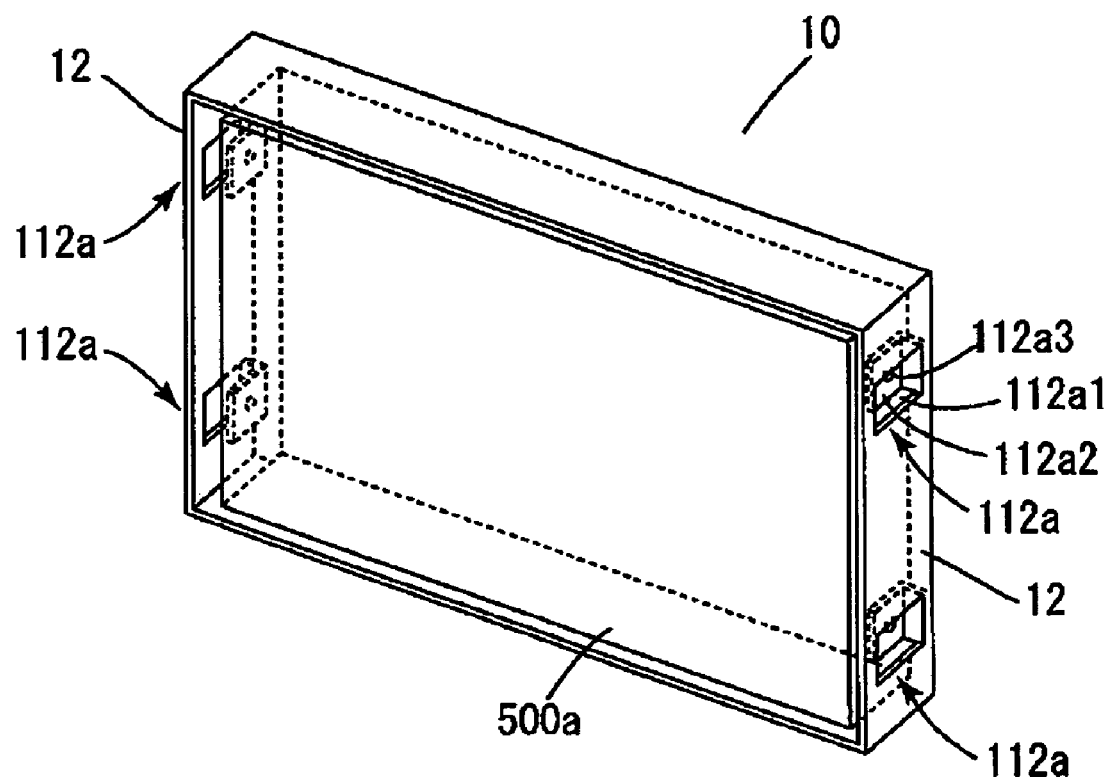
FIG. 5 is a perspective view showing the panel storage frame 10 according to a second embodiment.

FIG. 5 is a perspective view showing the panel storage frame 10 according to the second embodiment. Referring to the drawing, the panel storage frame 10 includes panel installation portions 112a each formed by folding the cut portion of the side surface 12. Specifically, the panel installation portion 112a is formed of a protrusion 112a1 extending inwardly with respect to the side surface 12, and a fixture 112a2 formed by folding the leading end of the protrusion 112a1 substantially perpendicularly. A through hole 112a3 through which a screw is threaded is formed in the panel installation portion 112a for tightening the panel 500a. The screw is threaded from outside the panel storage frame 10 to be tightened with the panel 500a for fixation.

The length of the protrusion 112a1 which is bent to protrude from the side surface 12 is changed to cope with the change in the size of the panel 500a to be stored in the panel storage frame 10. Specifically, the length of protruding portion of the protrusion 112a1 is changed to vary the inner periphery defined by the fixtures 112a2 each formed by folding the leading end of the protrusion 112a1 substantially perpendicularly. Accordingly, the size of the panel 500a to be threaded to the fixtures 112a2 may be changed corresponding to the thus defined inner periphery.

Figure 6A:
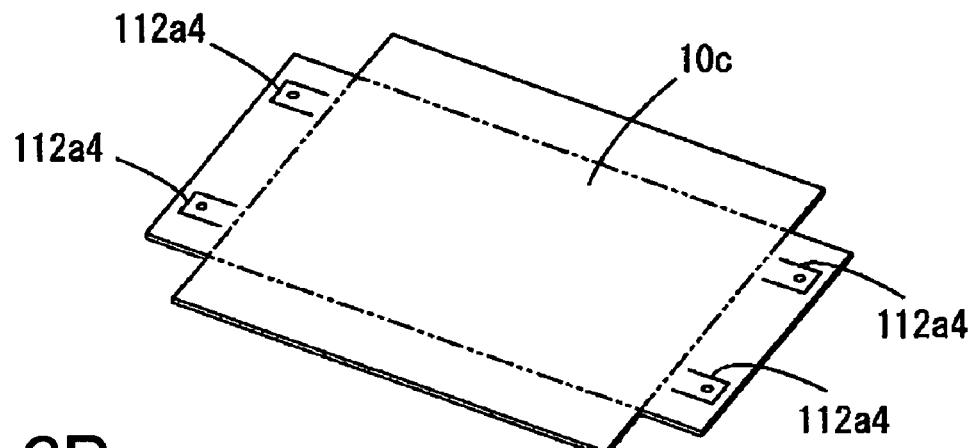
FIGS. 6A to 6C show the steps for producing the panel storage frame 10 according to the second embodiment.
Figure 6B:
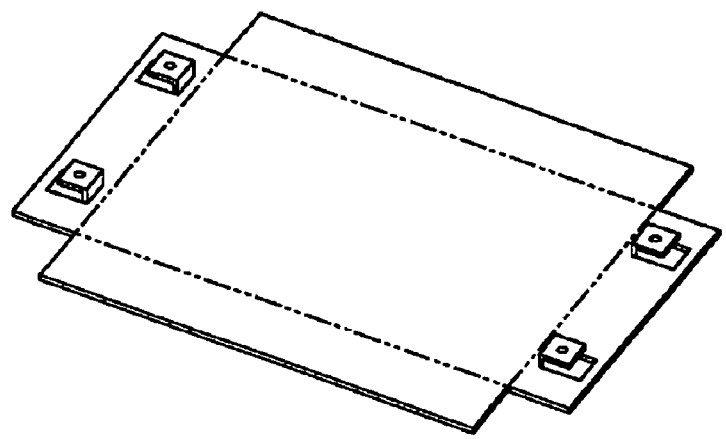
Figure 6C:
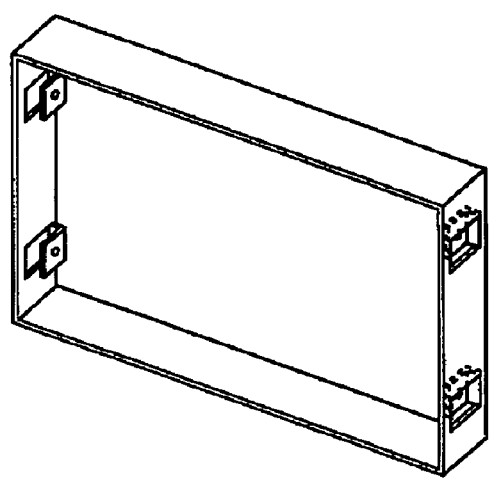

FIGS. 6A to 6C show the steps for producing the panel storage frame 10 according to the second embodiment. Referring to the drawing, the panel storage frame 10 according to the second embodiment is formed through the cutting step shown in FIG. 6A, the step for forming the panel installation portion shown in FIG. 6B, and the step for forming the outer peripheral surface shown in FIG. 6C. The steps for producing the panel storage frame 10, and the material sheet 10c used therefore in the respective steps are the same as those described in the first embodiment. Accordingly, the step for forming the panel installation portion 112a will be described in detail.

In the cutting step shown in FIG. 6A, the material sheet 10c is cut by the press mold. In the embodiment of the present invention, four notches 112a4 are cut in the portions of the material sheet 10c corresponding to the side surfaces 12 in order to form the panel installation portions 112a. Each dimension of the notches 112a4 is set to the sum of the lengths of the protrusion 112a1 and the fixture 112a of the panel installation portion 112a to be described later. In the present invention, a cut portion is made upon formation of the panel installation portion 112a to cope with the length which maximizes the protruding amount from the side surface 12. As the folding position of the cut portion is changed by the nesting blocks to be described later, the protruding amount from the side surface may be changed. In the step for forming the panel installation portion shown in FIG. 6B, the notches 112a4 cut with the press mold are bent substantially perpendicularly to the surface corresponding to the side surface 12. Then in the step for forming the outer peripheral surface shown in FIG. 6C, the outer peripheral surface is bent substantially perpendicularly to the portion corresponding to the back surface 11.

Figure 7:
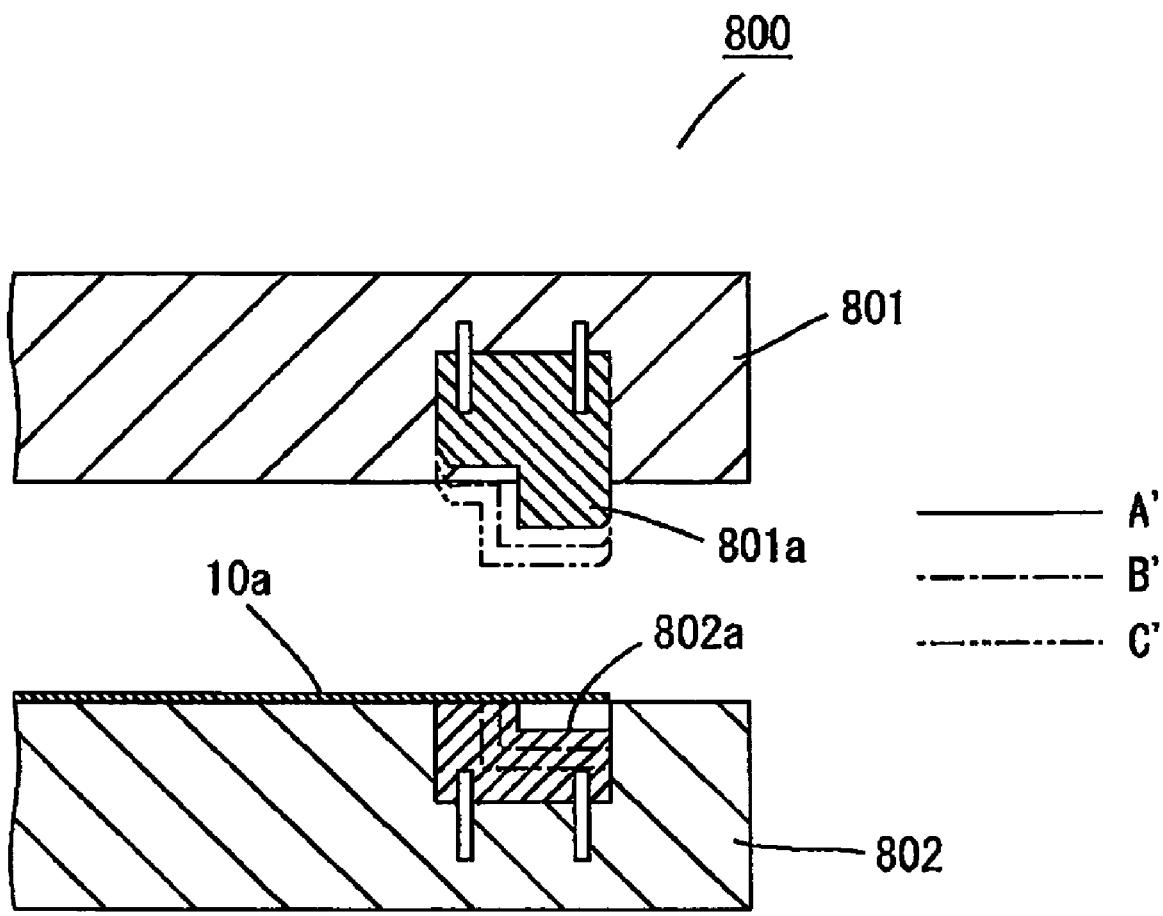
FIG. 7 is a view showing the step for forming the panel installation portion using a press mold 800 according to the second embodiment.

FIG. 7 is a view showing the step for forming the panel installation portion according to the second embodiment using a press mold 800. Referring to the drawing, the panel installation portion 112a is formed through the press working between an upper block 801 and a lower block 802 of the press mold 800. Each portion of the upper block 801 and the lower block 802 for forming the protrusion 112a1 and the fixture 112a2 of the panel installation portion 112a is replaceably fit with nesting blocks 801a and 802a, respectively. The nesting block 801a has a convex portion which protrudes from the press surface of the upper block 801. The nesting block 802a has an L-like cross section. The material sheet 10c set on the lower block 802 is extruded by the nesting block 801a to follow the L-like surface of the nesting block 802a to form the protrusion 112a1 and the fixture 112a2.

Referring to the drawing, three pairs of the nesting blocks 801a and 802a are used such that the protruding amount of the panel installation portion 112a from the side surface 12 is adjustable in three stages. Specifically, it is assumed that the nesting block 801a with the smallest protruding amount from the upper block 801 is defined as a nesting block A' (the leading end is indicated by the solid line), the nesting block 801a with the intermediate protruding amount is defined as a nesting block B' (the leading end is indicated by the dashed line), and the nesting block 801a with the largest protruding amount is defined as a nesting block C' (the leading end is indicated by the chain double-dashed line). The nesting blocks 802a corresponding to the respective nesting blocks 801a as described above are defined as the nesting blocks A', B' and C'. When the nesting blocks 801a and 802a defined as C' are used, the proximal portion of the cut portion is folded to maximize the protruding amount of the protrusion 112a1 from the side surface 12. Likewise, as the nesting blocks 801a and 802a defined as B' and A' are used in the order, the distance between the folding portion and the proximal portion becomes shorter, and accordingly, the protruding amount of the protrusion 112a1 from the side surface 12 becomes smaller in the aforementioned order.

In the embodiment, the step for cutting the side surface 12 and the step for the bending process are independently performed to form the panel installation portion 112a. However, the aforementioned cutting step and the bending step may be simultaneously performed by the use of the nesting blocks 801a and 802a of the upper and the lower blocks 801 and 802. In the aforementioned case, the length of the cut protrusion 112a1 may be changed in accordance with the protruding amount.

The direction of bending the panel installation portion with respect to the side surface 12 may be changed in the following manner. When the panel 500a is fixed to the panel installation portion, the direction of bending the protrusion of the panel installation portion is set not in accord with the load direction of the panel 500a. As the load direction of the panel 500a is not in accord with the bending direction, the position for bending the panel installation portion is not widened under the load of the panel 500a. The panel installation portion exhibits strength to bear the load of the panel 500a so as to be stably fixed.

Figure 8:
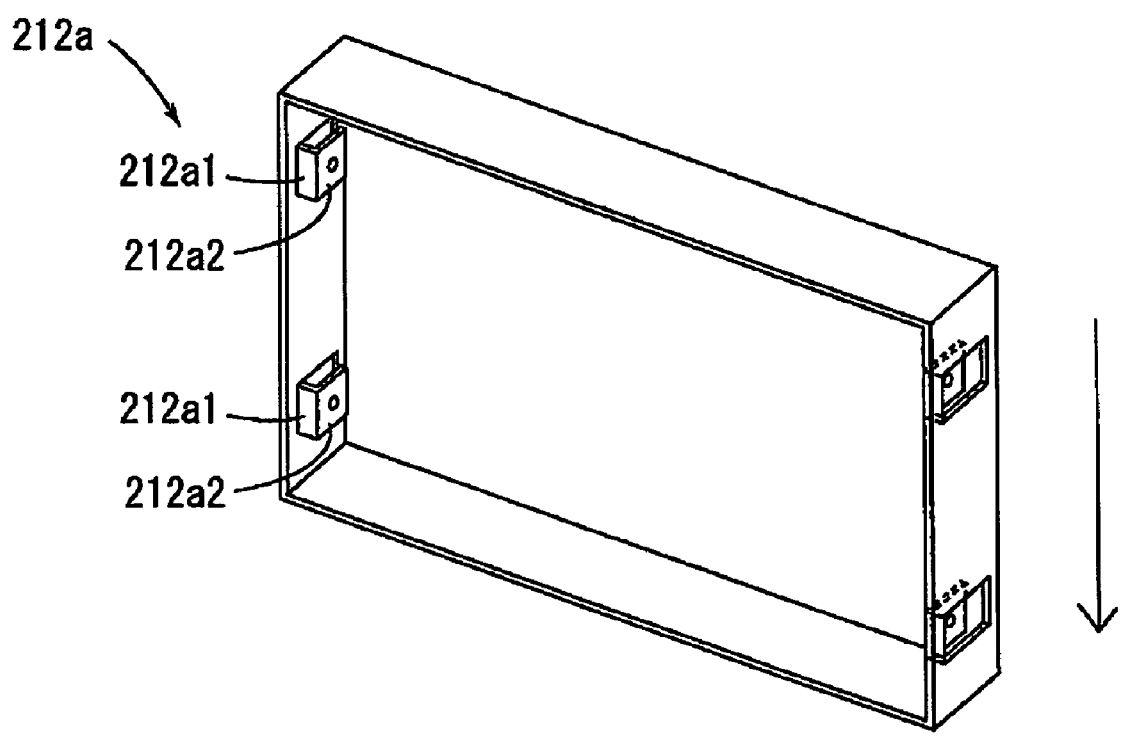
FIG. 8 is a view showing another example of the panel storage frame according to the second embodiment.

FIG. 8 is another specific example of the panel storage frame according to the second embodiment. Referring to the drawing, a protrusion 212a1 protruding from the side surface 12 of the panel storage frame 10 is bent in the direction substantially perpendicularly to the load direction (arrowed direction) of the panel 500a fixed to the fixture 212a2. The bending direction is not in accord with the load direction of the panel 500a such that the proximal portion of the protrusion 212a1 folded from the side surface 12 is not widened under the load.

(3) Third Embodiment

The panel installation portion may be structured as described below. Cut portions are made across the folding line between the back surface 11 and the side surface 12 of the panel storage frame 10, and the cut piece is bent to form the panel installation portion simultaneously with the bending of the side surface 12 substantially perpendicularly to the back surface 11. This makes it possible to eliminate the bending step to intensify the strength of the panel installation portion under the load of the panel 500a.

Figure 9:
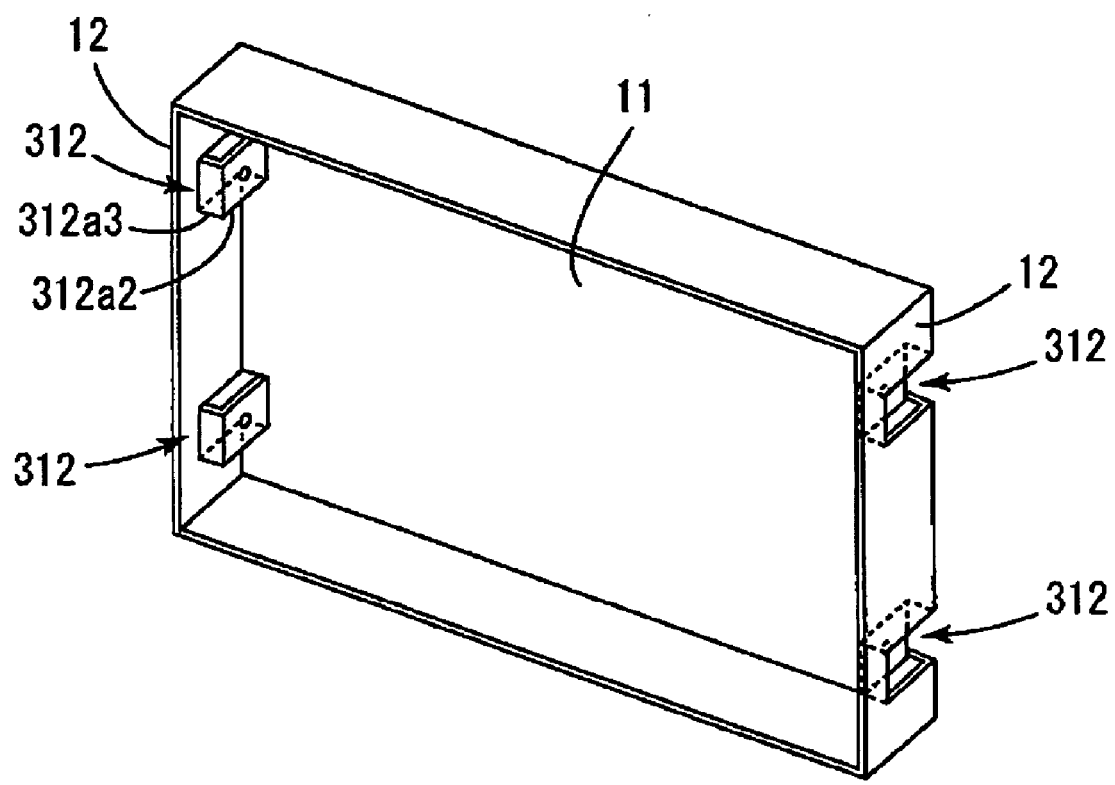
FIG. 9 is a view showing a panel storage frame 10 according to a third embodiment.

FIG. 9 is a view showing the panel storage frame 10 according to the third embodiment. Referring to the drawing, a panel installation portion 312a includes an inner fixture 312a2 and an inner protrusion 312a3 formed from the inner piece defined by two cut lines across the folding line between the back surface 11 and the side surface 12. The piece defined by the cut lines across the folding line between the back surface 11 and the side surface 12 is bent simultaneously with the bending process for forming the side surface 12. The bending step for forming the side surface 12 and the bending step for forming the panel installation portion 312a may be performed in the single step.

The inner fixture 312a2 is formed by folding the piece defined by the two cut lines across the portions of the back surface 11 and the side surface 12 substantially perpendicular to the back surface 11. The inner protrusion 312a3 is formed by bending the piece defined by the cut lines across the folding line between the back surface 11 and the side surface 12 substantially perpendicularly to the side surface 12. The inner fixture 312a2 is formed by folding the inner piece at the joint portion with the inner protrusion 312a3 substantially perpendicularly thereto. The inner fixture 312a2 and the inner protrusion 312a3 are formed from the single piece made by partially cutting the back surface 11 and the side surface 12. In the case where the single piece is folded with respect to the inner protrusion 312a3 such that the length of the inner fixture 312a2 extending from the back surface 11 is increased, the length of the inner protrusion 312a3 becomes short.

As the folding line of the inner piece between the inner fixture 312a2 and the inner protrusion 312a3 is changed, the length of the inner protrusion from the side surface 12 may be varied. In the case where the panel storage frame 10 is disposed having the opening to the front, the dimension of the inner periphery formed by the inner fixture 312a2 at the end of the inner protrusion 312a2 may be changed. The folding position at the inner fixture 312a2 with respect to the inner protrusion 312a3 is changed to allow the size of the panel 500a fixed to the inner fixture 312a2 to be adjustable.

Figure 10A:
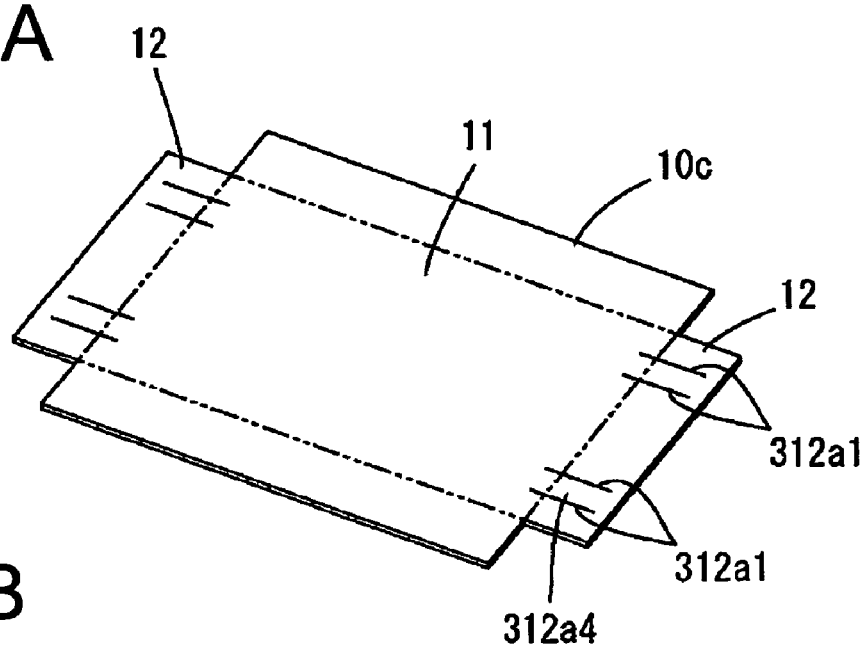
FIGS. 10A to 10C show the steps for producing the panel storage frame 10 according to the third embodiment.
Figure 10B:
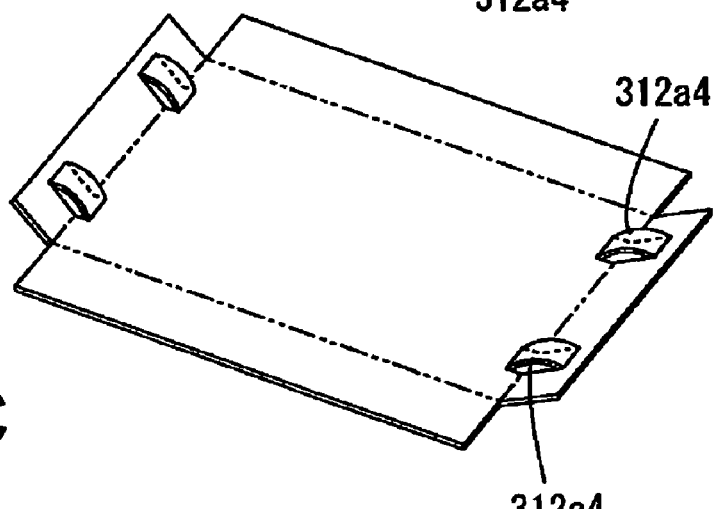
Figure 10C:
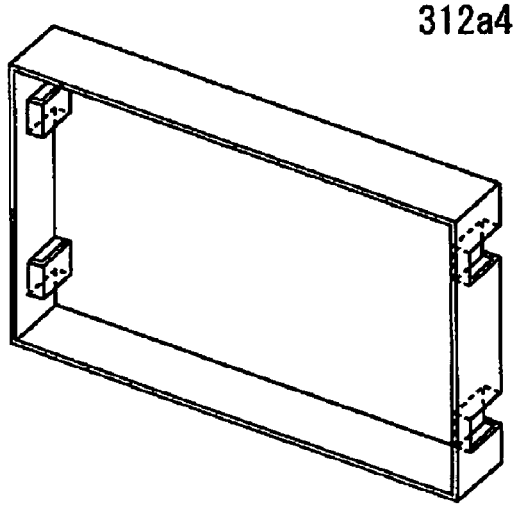

FIGS. 10A to 10C show the steps for producing the panel storage frame 10 according to the third embodiment. The production process shown in the drawing includes the cutting step shown in FIG. 10A and a bending step shown in FIG. 10B. In the cutting step shown in FIG. 10A, the material sheet 10c for forming the panel storage frame 10 is cut, and two cut lines 312a1 are formed for the respective portions across the back surface 11 and the side surface 12 corresponding to the panel installation portions 312a. Each length of the two cut lines 312a1 is equal to the sum of the lengths of the inner fixture 312a2 and the inner protrusion 312a3 of the panel installation portion 312a.

In the bending step shown in FIG. 10B, an inner piece 312a4 defined by the cut lines 312a1 is bent simultaneously with the bending process of the side surface 12. In the third embodiment, the folding position of the inner fixture 312a2 with respect to the inner protrusion 312a3 may be changed by exchanging the nesting blocks for forming the panel installation portion 312a in the upper and the lower blocks of the press mold for the bending process. The process will be described hereinafter in more detail.

Figure 11:
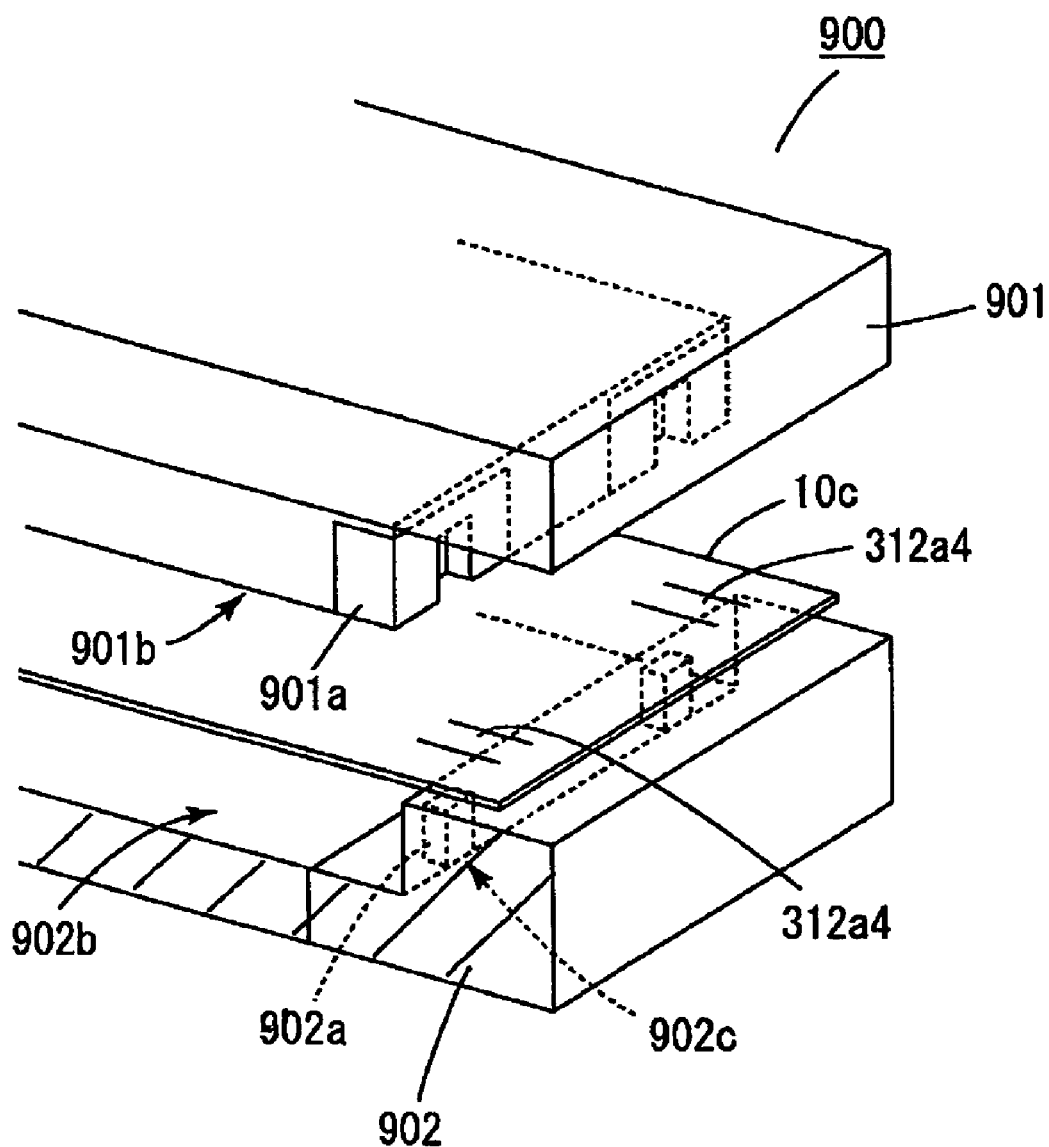
FIG. 11 is a perspective view partially showing an upper block 901 and a lower block 902 used for bending a side surface 12 in the third embodiment.

FIG. 11 is a perspective view partially showing an upper block 901 and a lower block 902 for bending the side surface 12 according to the third embodiment. In the drawing, the upper and the lower blocks for bending the side surface 12 with respect to the back surface 11 of the panel storage frame 10 are mainly shown, and illustration of the portion of the press mold for forming the top surface 13 and the bottom surface 14 is omitted. Nesting blocks 901a and 902a are attached to the respective portions of the upper block 901 and the lower block 902 for forming the panel installation portion 312a. The folding position between the inner fixture 312a2 and the inner protrusion 312a3 is changeable by exchanging those nesting blocks 901a and 902a.

More specifically, the lower block 902 includes a bottom surface 902a for forming the back surface 11 from the material sheet 10c, and a bending portion 902c erected from one end of the bottom surface 902b substantially perpendicularly to form the side surface 12, which form the L-like cross section. The upper block 901 includes an extrusion surface 901b corresponding to the L-like cross section of the lower block 902. The portion around the folded L-like cross section of the lower block 902 receives the nesting blocks 902a erecting from the bottom surface 902b at the predetermined interval to be detachably fixed. Likewise, the nesting block 901a with the recess portion corresponding to the configuration of the leading end of the nesting block 902a is detachably fixed to the upper block 901.

In the present invention, as two panel installation portions 312a are formed on the side surface 12, four nesting blocks 902a are disposed at both ends of the bottom surface 902b. Each pitch of the nesting blocks 901a and 902a disposed in the extruding surface 901b and the bottom surface 902b is the same as the pitch of the inner piece 312a4 formed in the material sheet 10c.

Figure 12A:
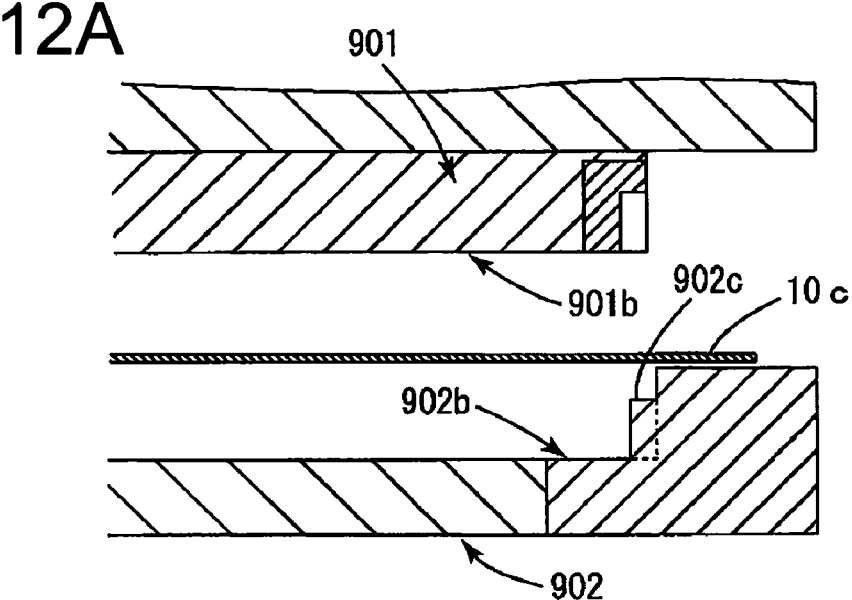
FIGS. 12A to 12C are cross-sectional views of the press mold taken along line D-D shown in FIG. 11.
Figure 12B:
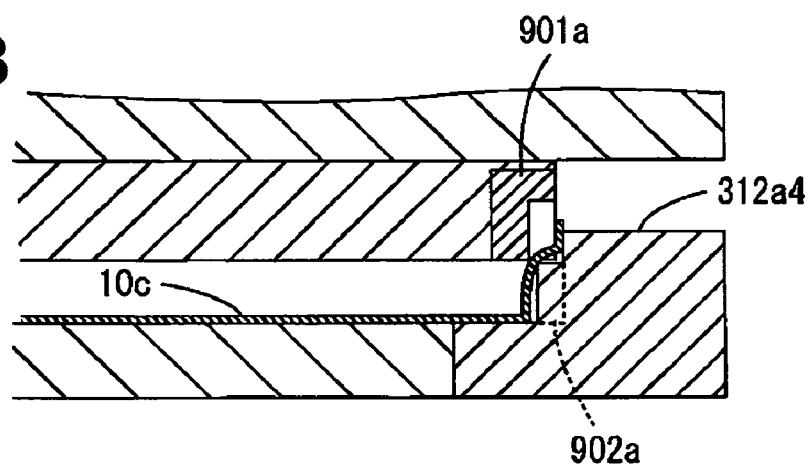
Figure 12C:
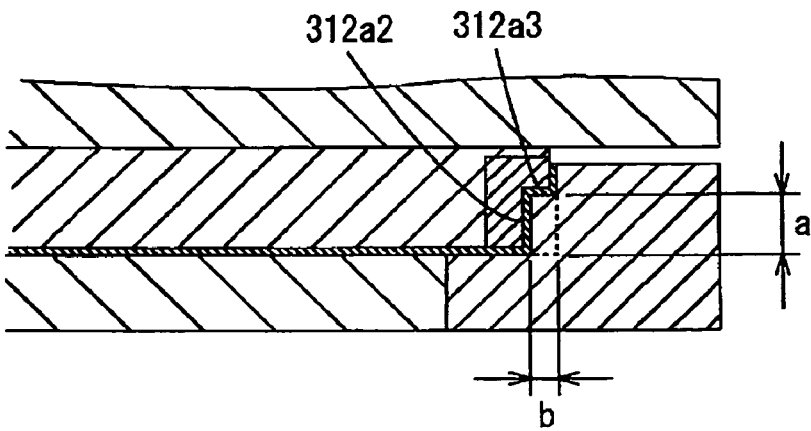
Figure 13:
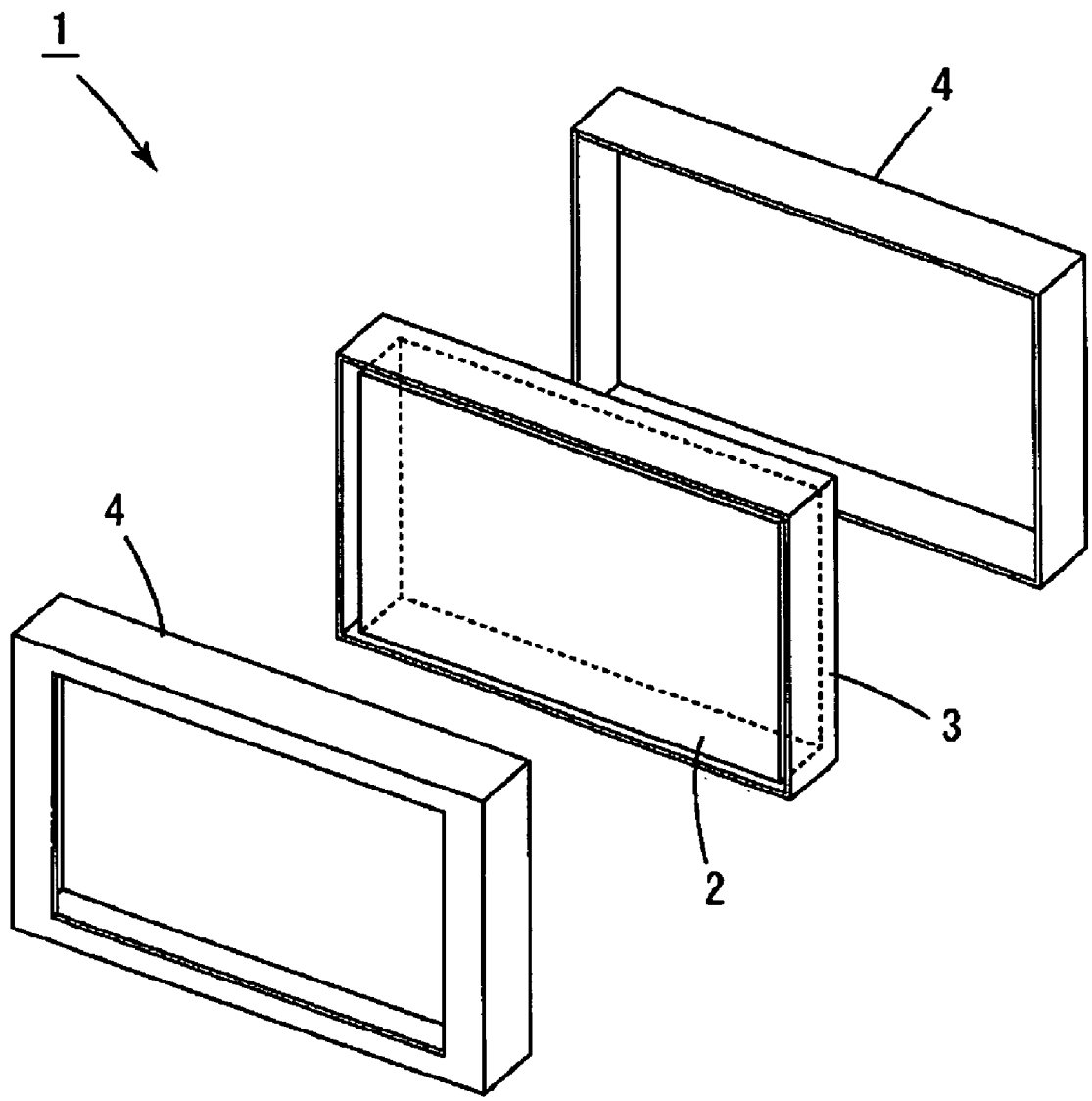
FIG. 13 is a view showing an inner structure of the generally employed flat-screen TV receiver.

FIGS. 12A to 12C are cross-sectional views each taken along line D-D of the press mold shown in FIG. 11. A material sheet 10c is cut into the belt-like form and rolled to follow the L-like inner peripheral surface formed by the bottom surface 902b and a bent portion 902c of the lower block with the extrusion surface 901b of the upper block 901 such that the side surface 12 is bent with respect to the back surface 11 of the panel storage frame 10 as shown in FIG. 12A. When the upper block 901 moves down to the predetermined position, the inner piece 312a4 defined by the cut lines 312a1 is curved to be moved upward by the nesting block 902a as shown in FIG. 12B. As the upper block 901 further moves down, the side surface 12 is folded substantially perpendicularly to the back surface 11, and the inner piece 312a4 is rolled between the nesting blocks 901a and 902a to form the panel installation portion 312a including the inner fixture 312a2 and the inner protrusion 312a3 as shown in FIG. 12C.

Then a vertical length a of the nesting block 902a from the bottom surface 902b to the leading end and a width b are changed, and the nesting block 901a having the groove with the configuration corresponding to the changed dimension is selected such that the folding position between the inner protrusion 312a3 and the inner fixture 312a2 is varied. Specifically, the nesting blocks 901a and 902a are exchanged to change the vertical length a from the bottom surface 902b to the leading end, and the folding position between the inner fixture 312a2 and the inner protrusion 312a3 is varied to increase the length of the inner fixture 312a2. The length of the inner protrusion 312a3 is reduced to increase the dimension of the inner periphery defined by the inner fixture 312a2 formed on both side surfaces 12.

As the width b is increased, the folding position of the inner protrusion 312a3 to the inner fixture 312a2 is changed to increase the length of the inner protrusion 312a3. As a result, the length of the inner protrusion 312a is increased to reduce the dimension of the inner periphery defined by the inner fixtures 312a2 formed on both side surfaces 12. This may change the dimension of the inner periphery defined by the respective inner fixtures 312a2 for threading the outer periphery of the panel 500a to cope with the dimensional change in the outer periphery of the panel 500a.

(4) Effect

As described above, the panel storage frame 10 fixes the panel 500a to the panel installation portions 12a so as to be stored inside. The method for manufacturing the panel installation portions 12a allows the portions of the upper and the lower blocks for manufacturing the panel installation portion to be formed as the nesting blocks. The nesting blocks may be exchanged to change the protruding amount of the panel installation portion from the outer peripheral surface upon execution of the press working. As a result, the position where the panel installation portion is fixed to the panel is changed to make it possible to store the panel with different size in the panel storage frame.

It is to be understood that the present invention is not limited to the embodiments as described above, and that variances described below shall be considered as embodiments disclosed in the present invention.

A variance in which any of the members disclosed in one of the embodiments are appropriately combined with any of those disclosed in the other embodiments and exchangeable with the members.

A variance in which the members and structures disclosed in the embodiments are appropriately exchanged with those disclosed in related arts but not disclosed in the embodiments or appropriately combined with one another.

A variance in which the members and structures disclosed in the embodiments are appropriately exchanged with those thought to be substitutes by a person with ordinary skill in the art but not disclosed in the embodiments, and appropriately combined with one another.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A method for producing a panel storage frame formed of a sheet metal for covering a thin display panel for displaying a video image through a press working, wherein the panel storage frame includes a panel installation portion on a surface opposite a side surface of the thin display panel for fixing the thin display panel to the panel storage frame; the method comprising:

forming the panel storage frame; and forming the panel installation portion with a portion of a press mold constituted by an exchangeable nesting block to change a protruding amount of the panel installation portion from a surface of the panel storage frame opposite the side surface of the thin display panel.

2. The panel storage frame production method according to claim 1, wherein:

the panel installation portion is formed through a deep draw processing to protrude inward from the surface opposite the side surface of the thin display panel; and the nesting block is exchanged to vary the protruding amount of the panel installation portion formed through the deep draw processing.

3. The panel storage frame production method according to claim 1, wherein:

the panel installation portion has a portion to be cut and erected from a surface opposite the side surface of the thin display panel, and a leading end of the cut and erected portion is folded to form the surface for fixing the thin display panel; and a length of the portion to be cut and erected from the surface opposite the side surface of the thin display panel is changed by exchanging the nesting block.

4. The panel storage frame production method according to claim 3, wherein the panel installation portion has the cut and erected portion from the surface opposite the side surface of the thin display panel bent in a direction not in accord with a direction of a load of the thin display panel fixed to the panel installation portion.

5. The panel storage frame production method according to claim 1, wherein:

the surface opposite the side surface of the thin display panel is bent to substantially perpendicularly extend from a surface opposite a back surface of the thin display panel;

the panel installation portion has two cut lines at a predetermined interval across a folding line between the surface opposite the back surface of the thin display panel and the surface opposite the side surface of the thin display panel, and has an inner portion defined by the two cut lines at the predetermined interval is folded at a position apart from a predetermined distance from the surface opposite the back surface of the thin display panel upon folding of the surface opposite the side surface of the thin display panel substantially perpendicularly to the surface opposite the back surface of the thin display panel; and the protruding amount of the panel installation portion from the side surface is changed by exchanging the nesting block to vary the length of the position to be folded from the side surface.

6. A panel storage frame formed of a sheet metal to cover a thin display panel for displaying a video image through a press working, comprising:

a panel installation portion that protrudes inward from a surface opposite a side surface of the thin display panel to fix the thin display panel to the panel storage frame; and wherein the panel installation portion formed with a portion of a press mold constituted by an exchangeable nesting block to change a protruding amount of the panel installation portion from the surface of the panel storage frame opposite the side surface of the thin display panel, and make a size of the panel allowed to be stored in the storage frame.

7. The panel storage frame according to claim 6, wherein:
the panel installation portion is formed through a deep draw processing to protrude inward from the surface opposite the side surface of the thin display panel; and
the nesting block is exchanged to vary the protruding amount of the panel installation portion formed through the deep draw processing.

8. The panel storage frame according to claim 6, wherein:
the panel installation portion has a portion to be cut and erected from the surface opposite the side surface of the thin display panel, and a leading end of the cut and erected portion is folded to form a surface for fixing the thin display panel; and
a length of the portion to be cut and erected from the surface opposite the side surface of the thin display panel is changed by exchanging the nesting block.

9. The panel storage frame according to claim 8, wherein the panel installation portion has the cut and erected portion from the surface opposite the side surface of the thin display panel bent in a direction not in accord with a direction of a load of the thin display panel fixed to the panel installation portion.

10. The panel storage frame according to claim 6, wherein:
the surface opposite the side surface of the thin display panel is bent to substantially perpendicularly extend from a surface opposite a back surface of the thin display panel;
the panel installation portion has two cut lines at a predetermined interval across a folding line between a surface opposite the back surface of the thin display panel and a surface opposite the side surface of the thin display panel, and has an inner portion defined by the two cut lines at the predetermined interval is folded at a position apart from a predetermined distance from the surface opposite the back surface of the thin display panel upon folding of the surface opposite the side surface of the thin display panel substantially perpendicularly to the surface opposite the back surface of the thin display panel; and
the protruding amount of the panel installation portion from the side surface is changed by exchanging the nesting block to vary the length of the position to be folded from the side surface.

* * * * *